2,749,229
Patented June 5, 1956

2,749,229

PLANT GROWTH REGULATION WITH CHLOROPHENYL CYANOACRYLIC ACIDS AND DERIVATIVES

Waldo B. Ligett, Pontiac, and Calvin N. Wolf, Detroit, Mich., assignors to Ethyl Corporation, New York, N. Y., a corporation of Delaware No Drawing. Application May 6, 1952,
Serial No. 286,433

8 Claims. (Cl. 71—2.4)

This invention relates to a novel class of synthetic organic compounds which exhibits important, and in many respects heretofore unknown, responses in the growth processes of plants. More specifically, our invention relates to materials containing the α-cyano-β-chlorophenyl acrylic grouping.

Much attention has been directed in recent years to providing controlled regulation of the morphological processes of living plants, wherein the term "plant" is used in the broadest sense of the term. A number of materials have been described, both naturally occurring and synthetic, which produce morphological responses in plants. In general, more or less specificity has been noted, both with regards to the plant species effected and to method of application. Likewise, the effects appear to be limited to narrow concentration ranges of the material being applied. Furthermore, chemicals quite specific in structure or formulation have been required.

One important effect is the stimulation of growth. This can take many forms but in general each such effect can be achieved by only a limited number of materials. Among the growth stimulation effects can be noted a development of oversize plant parts as, for example, the development of blossoms or fruits of larger than normal size. Other examples of growth stimulation include increasing the rate of formation of root systems principally from cuttings.

Another important effect achieved by certain growth regulants includes the suppression of one or more growth processes. Certain materials are known to be capable of preventing the formation of the abscission layer of cells in plant appendages. This effect finds application in preventing premature drop of fruit.

Stil another type of growth regulation is shown by a general increase in the rate of growth of a plant and usually materials which are effective in this respect when employed in large concentrations exhibit a growth destruction effect as a result of over-stimulation of the growth process. Such materials which do not permit normal growth in the useful growth stimulation range of concentrations, cause more or less deformities in the plant such as bending or epinasty of the stem.

One characteristic of a growth regulant is translocation, that is, when applied at a specific point in the plant organism the effect may be observable at a site distant from the application. For this reason it was at one time customary to refer to such materials as plant hormones by analogy to the materials which have a hormonic effect in animal organisms.

In the materials previously known control of the desired effect has been difficult to achieve and the period of application in the growth cycle has been of extreme importance. Furthermore, the selectivity of the material towards the plant organism has, in most instances, been insufficient to permit widespread application under field conditions without subjecting other plants in the area to the effect of the materials being applied with consequent destructive effects.

It is an object of our invention to provide a novel chemical grouping having plant growth regulant properties. It is a further object of our invention to provide materials which, when applied to living plants, can produce important and novel morphological responses in a controlled manner. Other objects of our invention will appear from the further description hereinafter.

The novel compounds which we have discovered comprise the α-cyano-β-(p-chlorophenyl) acrylic and the α-cyano-β-(m-chlorophenyl) acrylic structures. We have found that a chlorine atom in the meta or para position of the phenyl group of the α-cyano-β-phenyl acrylic structure imparts high morphological activity.

In general the plant response chemicals of our invention possess the structure

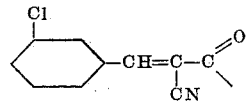

and

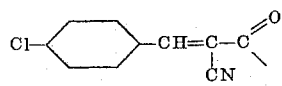

In addition to the free acids of the above growth regulant compounds we have found that by forming derivatives of the carboxylic group we retain the activity associated with the characteristic structure of the compounds of our invention while often changing secondary properties which for certain applications place the materials in a more practical form for use. However, the groupings portrayed graphically above are the active units of our materials, and such activity remains on forming carboxylic derivatives thereof. In other words, the organism responds to these groupings. For example by converting the free acids to metallic salts thereof, the solubility of our materials can be changed to permit dilution of our compounds in water or certain other polar solvents. Furthermore, the volatility is thus controlled to make it more suitable for certain applications. However, by such modification the growth response characteristic is not destroyed. For example the alkali metal salts such as those of lithium, sodium and potassium provide derivatives of water solubility; also the salts of the alkaline earth metals, for example magnesium, calcium, strontium and barium can be employed. Likewise for certain applications we prefer the heavy metal salts such as, for example, nickel, chromium, copper, zinc, silver, mercury, molybdenum, antimony, bismuth, tin, aluminum, manganese, iron and lead salts. While the employment of our growth regulant materials in the form of the metallic salts does not substantially effect their morphological activity, certain embodiments thereof possess important secondary properties, such as for example imparting fungicidal, bacteriostatic, or antiseptic activity along with the growth regulant activity. Further important improvements in ease of formulation and weathering characteristics can be so achieved.

Other salts of our materials can be formed without materially altering the growth regulant properties, such as for example the ammonium salts, hydrazonium salts and other nitrogen-containing salts, such as salts formed with alkyl, aryl and other organo-substituted nitrogen bases. Examples of such nitrogen-containing groups which form salts with our compounds include trimethylammonium, triethylammonium, phenylammonium, monoethanol-, diethanol- and triethanolammonium salts, dimethylpropylammonium and tribenzylammonium salts. Furthermore, forming ammonium salts with high molecular weight organic radicals such as for example the methyl-ethyl-octadecyl-ammonium group, can provide materials having bacteriostatic effects and important solubility relationships and surface activity. Such modification of the α-cyano-β-(p- or m-chlorophenyl) acrylic structure can be employed to impart desirable solubility, weathering, volatility and formulating characteristics as well as for some purposes modify the prevalent properties of the growth response chemical. In general such ammonium and hydrazonium salts of our growth regulants contain the groupings

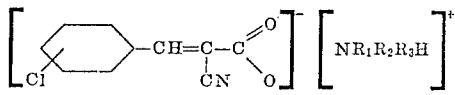

or

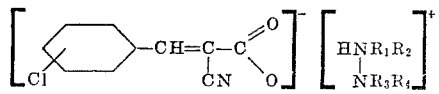

wherein the chlorine is meta or para and $R_1$, $R_2$, $R_3$, and $R_4$ include hydrogen, alkyl, cycloalkyl, aralkyl, aryl or combinations thereof as well as substitution products thereof. Thus, such R groups can be hydrogen, methyl, ethyl, propyl, isopropyl, butyl, sec.-butyl isobutyl, ter.-butyl, the isomeric amyl, hexyl, heptyl, octyl, nonyl, decyl groups, and the like including higher alkyl groups such as stearyl, lauryl, oleyl, octadecyl and the like; cycloalkyl such as cyclobutyl, cyclopentyl, cyclohexyl and the like and substituted cycloalkyl such as methylcyclopentyl, methylcyclohexyl, dimethylcyclohexyl, isopropylcyclohexyl and the like; aralkyl such as benzyl, α-phenethyl, β-phenethyl, α-phenyl-β-chloro-ethyl, ar.-chlorobenzyl, ar.-nitrobenzene; aryl groups such as phenyl, α-naphthyl, β-naphthyl, p-diphenyl, o-tolyl, m-tolyl, p-tolyl, o-xylyl, 4-ethylphenyl, α-(2-methylnaphthyl), o-chlorophenyl, p-chlorophenyl, 2,4-dichlorophenyl, nitrophenyl, acetophenyl and the like. In general, such groups $R_1$, $R_2$, $R_3$, and $R_4$ can contain negative substituents such as halogen, hydroxyl, hydrocarbonoxy, carbonyl, nitro, nitroso, nitramino, amino, substituted amino, hydroxylamino, sulfhydryl, sulfide, imino and the like groups to further modify the primary growth response characteristics with regard to toxicity, volatility, ease of formulation or produce secondary effects such as penetration and the like.

Further derivatives of our novel growth regulants comprise the thiouronium salts of the α-cyano-β-chlorophenyl acrylic acids.

A similar class of derivatives of our α-cyano-β-chlorophenyl acrylic growth regulants comprise the organometallic salts. Typical examples of such salt-forming groups which we can incorporate into our growth regulant structure include alkyl-, aryl- and alkylaryl-metallo groups. Generally, such embodiments conform to the structure

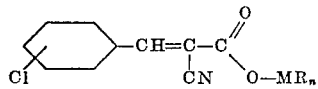

wherein the chlorine is meta or para and M is any metal which will form organometallic compounds of suitable stability, $n$ is an integer which is one less than the valence of the metal and R is one or more hydrogen, organo, alkyl, cycloalkyl, aryl, aralkyl, alkaryl, alkoxy or aryloxy groups or substituted derivatives thereof and combinations thereof. Typical examples of such metals include mercury, tin, lead, antimony, bismuth, arsenic, germanium, aluminum, boron, gallium, silicon, zinc, tellurium and the like. Thus, for example methylmercuri, phenylmercuri, ethylmercuri, dibenzyltin, diphenyltin, diethyltin, triethyltin, triphenyltin, diphenylgermanium, dibenzylgermanium, triethylgermanium, dimethylphenylgermanium, ethylthallium, diethylsilicon, dimethylsilicon, diphenylbismuth, ethylcadmium, phenylcadmium, dimethylaminophenylmercuri, ethylmercaptomercuri, tolylmercuri, α-furfurylmercuri, methyltelluri, ethyltelluri, phenyltelluri, trimethyltelluri, dimethylphenyltelluri, dimethylboro, methylphenylboro, dicyclohexylboro, borohydro, boroetherate, dimethyl-p-anisylboro, dimethylarseno, diphenylarseno, methylphenylarseno, dimethylaluminum, diethylaluminum, methylphenylaluminum, ethylzinc, isopropylzinc and methylzinc, α-cyano-β-(m-chlorophenyl) acrylates, and α-cyano-β-(p-chlorophenyl) acrylates and the like can be prepared and retain the growth regulant characteristics.

In addition to the salt-like derivatives of our compounds, we can employ them in the form of esters. Among the organic esters which we can employ are the alkyl esters such as for example methyl, ethyl, n-propyl, isopropyl, butyl and isomeric butyl, amyl, hexyl, heptyl, octyl, nonyl, and decyl esters, as well as the higher aliphatic esters such as stearyl, lauryl, and oleyl, esters; cycloalkyl esters such as cyclobutyl, cyclopentyl, cyclohexyl, esters of the polyethers and polyhydric alcohols such as for example esters of pentaerythritol, ethylene glycol, methoxyethanol, ethoxyethanol, butoxyethanol, butoxy ethoxy propanol, polyethylene and polypropylene glycols and the various carbitols and Cellosolves, and the like. Likewise aryl esters can be employed and in some instances these are preferred. Examples of such esters include the phenyl, tolyl, xylyl, p-diphenyl, terphenyl, o-diphenyl, α-naphthyl, β-naphthyl esters and the like. We have also found that by substituting other groups or radicals into such organic esters we can achieve important improvements in the applicability of our materials. Thus, in the alkyl and aryl esters of our compounds enumerated above we can provide the corresponding esters wherein negative groups such as a halogen including chlorine, bromine, fluorine and iodine, or various nitrogen-containing radicals such as nitro, nitroso, amino, substituted amino groups, or sulfur-containing radicals such as for example mercaptyl, substituted mercaptyl, sulfide, sulfonic, sulfonyl and sulfonamide radicals and the mixtures thereof are incorporated therein. Thus, we can form the β-chloroethyl, β-bromoethyl, γ-fluoropropyl, 2-hydroxycyclohexyl, β-thiocyanoethyl, β-mercaptoethyl, 4-aminobutyl, diethylaminomethyl, β-dimethylaminoethyl, β-sulfoethyl, and the like, α-cyano-β-(m- and p-chlorophenyl) acrylates. Likewise p-tolyl, p-anisyl, 2-nitrophenyl, 2,4-dichlorophenyl, pentachlorophenyl, 2,4,5-trichlorophenyl, p-aminophenyl, o-(M,N-dimethylaminophenyl), α-(4-nitronaphthyl), and the like, α-cyano-β-chlorophenyl acrylates produce novel plant response effects. Similarly typical aralkyl esters provide these effects such as for example β-phenethyl, α-(β-naphthylethyl), benzyl, p-nitrobenzyl, p-chlorobenzyl, 2,4-dichlorobenzyl, 2,4,5-trichlorobenzyl and the like esters are effective as well as the heterocyclic esters such as the furfuryl, thiophenyl, quinolyl and morpholinyl esters.

Other derivatives of the carboxylic function of the growth regulant compositions of our invention include those wherein nitrogen-containing groups replace the hydroxyl of the carboxylic acid. Typical examples of such embodiments of the compounds of our invention include amide and substituted amide groups. Thus, we can provide N-methyl, N-ethyl, N-dimethyl, N-diethyl, N-methylpropyl, N-phenyl, N-p-tolyl, N-xylyl, N-methyl-N-phenyl, N-ethyl-N-phenyl, N-benzyl, N-n-butyl, N-hexyl, N-p-chlorophenyl, N-2,4-dichlorophenyl, N-2,4,5-trichlorophenyl, N-pentachlorophenyl, N-p-diphenyl, N-o-diphenyl, N-o-nitrophenyl, N-p-aminophenyl, N-o-dimethylaminophenyl, N-p-tolylsulfonyl, N-p-dimethylammomethylphenyl, N-p-anisyl, N-α-naphthyl, N-β-naphthyl, N-α-(2-aminonaphthyl), N-(p-chlorobenzyl), N-(β-phenethyl), N,N-dibenzyl, N-methyl-N-benzyl, N-(β-hydroxyethyl)-N-benzyl, and the like, α-cyano-β-(m- and p-chlorophenyl) acrylamides as well as the unsubstituted acrylamides and N-(α-cyano-β-chlorophenyl acrylyl)

morpholine and similar heterocyclic amides, as well as N-(α-pyridyl), N-(β-pyridyl), N-(γ-pyridyl), N-(α-thiophenyl), N-(β-quinolyl), N-(α-pyridyl)-N-benzyl and the like acrylamides of our invention.

Furthermore, the compounds of our invention comprise the thiolacid derivatives of α-cyano-β-(m- and p-chlorophenyl) acrylic acid, such as

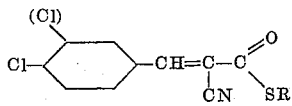

wherein R is hydrogen as in the thiolacids or alkyl, cycloalkyl, aryl, alkylaryl, aralkyl, and the like as in the thiol esters. Thus our compounds comprise α-cyano-β-(m- and p-chlorophenyl) thiolacrylic acid as well as, for example, the methyl, ethyl, propyl, isopropyl, butyl, sec.-butyl, isobutyl, ter.-butyl, the isomeric amyl, hexyl, heptyl, octyl, nonyl, decyl, stearyl, lauryl, oleyl, octadecyl, cyclobutyl, cyclopentyl, cyclohexyl, methylcyclopentyl, methylcyclohexyl, dimethylcyclohexyl, isopropylcyclohexyl, benzyl, β-phenethyl, α-phenethyl, α-phenyl-β-chloroethyl, ar.-chlorobenzyl, ar.-nitro-benzyl, aryl groups such as phenyl, α-naphthyl, β-naphthyl, p-diphenyl, o-tolyl, m-tolyl, p-tolyl, o-xylyl, 4-ethylphenyl, α-(β-methylnaphthyl), o-chlorophenyl, p-chlorophenyl, 2,4-dichlorophenyl, nitrophenyl, acetophenyl esters and the like. Furthermore, other thiolacid derivatives of our compounds possess growth response characteristics such as, for example, the metallic, ammonium, hydrozonium, and organometallic salts as above.

Still other derivatives of the α-cyano-β-chlorophenyl acrylic growth response structure of our invention which have utility in providing morphological responses and are useful as intermediates in further chemical modification include the acid halides, among which the more useful are the chlorides and bromides.

In the following non-limiting, illustrative examples of methods of preparing specific examples of the compounds of our invention and description of certain properties thereof, all parts and percentages are by weight.

The α-cyano-β-polychlorophenylic growth response agents of our invention can exist in two geometrically isomeric forms in accordance with the following formulas typified by the para embodiment.

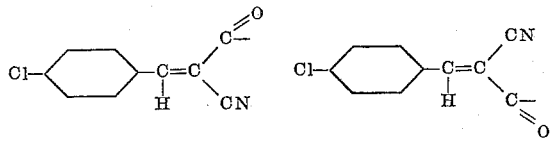

According to the procedure of Example I the stable isomer is formed. This material can be converted to the labile form by suitable methods and such labile isomer can be reconverted to the stable form, for example by heating in benzene in the presence of ultraviolet irradiation.

EXAMPLE I

*Sodium α-cyano-β-(p-chlorophenyl) acrylate.*—In a reactor provided with an agitator was placed a solution of 42.5 parts of cyanoacetic acid in 170 parts of water. This solution was neutralized with 26.7 parts of sodium carbonate in 42 parts of water. While warming to a temperature of 40° C. a solution of 3.3 parts of sodium hydroxide in 208 parts of water was thereupon added, followed by 67.7 parts of p-chlorobenzaldehyde over a period of one hour with vigorous agitation. Stirring at this temperature was maintained for an additional two hours. Upon cooling to 25° C., the sodium salt of α-cyano-β-(p-chlorophenyl) acrylic acid separated as white crystals. This was recovered by filtration to yield 90 per cent (100 parts) of product.

EXAMPLE II

*α-Cyano-β-(p-chlorophenyl) acrylic acid.*—Seventy-five parts of the sodium salt of α-cyano-β-(p-chlorophenyl) acrylic acid prepared as in Example I was treated with 200 parts of 10 per cent hydrochloric acid. By this procedure 62.3 parts of white crystalline acid was obtained having a melting point of 189–191.5° C.

EXAMPLE III

*α-Cyano-β-(m-chlorophenyl) acrylic acid.*—Sodium cyanoacetate treated with 67.7 parts of o-chlorobenzaldehyde according to the procedure of Example I. The so-produced sodium salt of α-cyano-β-(m-chlorophenyl) acrylic acid was treated with hydrochloric acid according to the procedure of Example II to produce 14.5 parts, 44 per cent yield, of α-cyano-β-(m-chlorophenyl) acrylic acid melting at 169–171° C. This product contained 17.1 per cent chlorine, which is the amount calculated for the formula $C_{10}H_6O_2NCl$.

Other salts of the growth regulants of our invention can be prepared directly as in Example I, or by way of the acid, by neutralization with the appropriate base, or by metathesis with the sodium derivative and an appropriate salt. Esters can be prepared by employing the appropriate ester of cyanoacetic acid, as for example ethyl cyano acetate, when treated with p-chlorobenzaldehyde produces ethyl α-cyano-β-(p-chlorophenyl) acrylate.

We have described the preparation of α-cyano-β-(m-chlorophenyl) acrylic acid and α-cyano-β-(p-chlorophenyl) acrylic acid. Furthermore, we have shown illustrative examples of methods of preparing carboxylic derivatives thereof. In general, the manufacture of such derivatives is achieved by methods well known to those skilled in the chemistry of organic carboxylic acids. Other methods than those illustrated will be apparent.

Compounds containing the α-cyano-β-(m- or p-chlorophenyl) acrylic structure possess the remarkable property of plant growth control without visible injury. In some applications in certain varieties of plants this property is evidenced by either a growth inhibition or suppression, or a growth stimulation. Thus when applied to young growing plants, normal growth can be suppressed and proceed at a decreased level of activity. In general, the effects produced by the novel structure of our invention occur through a variety of methods of application. Thus in leafy plants the application can be made directly to the leaf structure, either to the entire leaf structure or to a single leaf. In the latter instance, this clearly demonstrates a translocation of the active ingredient throughout the plant structure. For example, when a single leaf of a tomato plant is treated with a suspension of α-cyano-β-(p-chlorophenyl) acrylic acid at a 1 per cent aqueous concentration, the treated leaf withers but no other immediate effects are noted from the balance of the plant. Ten days later the height of the treated plant will be suppressed compared to the height of a control plant.

It is frequently noted in treating growing leafy plants with the growth regulants of our invention that apical dominance is decreased, permitting activity of the axillary buds, whereas response to other growth regulants of a suppressive nature is an overall slow down of growth.

To further illustrate the nature of the growth suppressant effect of the compounds of our invention, a series of test applications was made upon young (5 inch) tomato plants of the Bonny Best variety. In these demonstrations, a suspension of the growth regulant in water containing 0.1 per cent Tween 20 as a wetting agent was sprayed to the extent of 20 milliliters of formulation on five inch plants growing four to a pot. One plant in each pot was carefully protected from the spray and served as a control. Observations were made of both the treated and control plants at periodic intervals as shown in the table. The data in the table indicate the per cent growth in comparison with the check plants during the indicated intervals. Typical of the normal growth, at the end of 21 days the control plants attained a height of fourteen inches. Although there was no tissue damage in the treated plants and the color was normal the treated plants exhibited formative effects, being unusually bushy with numerous axillary branches. As the observations were continued beyond the indicated period the growth levels of the treated plants began to approach the growth level of the control plants. Upon further observation, the treated plants continued to develop with the formation of buds, flowers and fruits.

The α-cyano-β-(m- or p-chlorophenyl) acrylic structure is responsible for the growth response effect. Thus the free acids, the metal salts, esters, diethanolammonium, triethanolammonium and organometallic salts, and amide derivatives and the like show growth regulation. Furthermore both geometrically isomeric forms (stable and labile) of the α-cyano-β-(m- and p-chlorophenyl) acrylic structures show distinct hormone-like effect upon growing tomato plants.

TABLE

*Increase in height of tomato plants, percent of control, 30 days after treatment with growth regulant*

| Compound | Concentration, Weight Percent | Percent Growth |
| --- | --- | --- |
| α-Cyano-β-(p-chlorophenyl) acrylic acid | 0.4 | 40 |
|  | .2 | 48 |
|  | .1 | 55 |
|  | .05 | 89 |
| α-Cyano-β-(m-chlorophenyl) acrylic acid | 0.4 | 36 |
|  | .2 | 64 |
|  | .1 | 76 |
|  | .05 | 80 |

In the above tests even at the lowest concentration employed none of the plants showed blossoms while the control plants in the same period had well developed fruit.

Other typical α-cyano-β-chlorophenyl acrylic growth regulants exhibiting similar effects on tomato or other growing plants include: sodium α-cyano-β-(m-chlorophenyl) acrylate, lithium α-cyano-β-(p-chlorophenyl) acrylate, barium α-cyano-β-(m-chlorophenyl) acrylate, ethyl α-cyano-β-(m-chlorophenyl) acrylate, β-chloroethyl α-cyano-β-(p-chlorophenyl) acrylate, triethyllead α-cyano-β-(m-chlorophenyl) acrylate, dimethylaminophenylmercuri α-cyano-β-(p-chlorophenyl) acrylate, α-furfuryltin α-cyano-β-(p-chlorophenyl) acrylate, β-dimethylaminoethyl α-cyano-β-(m-chlorophenyl) acrylate, butoxypolyethoxy α-cyano-β-(m-chlorophenyl) acrylate, 2,4-dichlorophenyl α-cyano-β-(p-chlorophenyl) acrylate, (mono-(α-cyano-β-(p-chlorophenyl) acrylate) of ethylene glycol monomethylether, di-(α-cyano-β-(m-chlorophenyl) acrylate) of ethylene glycol, butoxy-propoxypropyl ester of α-cyano-β-(p-chlorophenyl) acrylic acid, vinyl α-cyano-β-(m-chlorophenyl) acrylate, butyl α-cyano-β-(p-chlorophenyl) acrylate, copper α-cyano-β-(p-chlorophenyl) acrylate, tetramethylhydrazonium α-cyano-β-(p-chlorophenyl) acrylate, β-thiocyanoethyl α-cyano-β-(m-chlorophenyl) acrylate, N-methyl α-cyano-β-(m-chlorophenyl) acrylamide, N-(β-hydroxyethyl)-N-benzyl α-cyano-β-(p-chlorophenyl) acrylamide, N-(2,4,5-trichlorophenyl) α-cyano-β-(m-chlorophenyl) acrylamide, N-(α-naphthyl) α-cyano-β-(p-chlorophenyl) acrylamide, α-cyano-β-(m-chlorophenyl) thioacrylic acid, ar.-chlorobenzyl α-cyano-β-(p-chlorophenyl) thioacrylate, trichloromethyl α-cyano-β-(m-chlorophenyl) thioacrylate, and the like.

To indicate the lack of injury to the growing plants after treatment with the growth regulants of our invention, observations made on treated plants for prolonged periods showed that as growth continued the treated plants matured normally and approached the growth rate of the controls. The only variation was in concentration, as indicated, of the active ingredient. Considering the data presented for α-cyano-β-(p-chlorophenyl) acrylic acid, it is evident that at concentrations of the order of 0.1 percent and higher growth of the young plants was essentially halved. However, when only a moderate suppression of growth is desired, it is apparent that this can be achieved by employing still smaller concentrations, of the order of 0.05 per cent. By selection of a particular carboxylic derivative and a method and time of application, as well as concentration, control of growth effects can be achieved which are important in determining the ripening time or maturity of a fruit or other yield crop upon which the material is applied. This ability to control the rate of growth and the time of maturity is of extreme importance to the agricultural industry, both to determine in advance the period in which the harvest can be made, and also to overcome dependence upon climatic and other factors normally beyond the control of the grower. Thus if a young crop is planted and adverse growing conditions are encountered, it is possible by employing the compounds of our invention to delay, for example, the setting of fruit until climatic conditions are more favorable for the maturing and ripening of such fruit. Still other methods of employing the novel growth suppression effects of our compounds will be apparent.

The ability to suppress the growth of plant species is not limited to any one class of plants or plant species. Thus, for example, a great variety of important agricultural plant types can be treated with the compounds of our invention and achieve important growth regulation effects. Among the many varieties of plants which have been so treated successfully by the compounds of our invention are included those primarily grown for their flowers, those primarily grown as fruit crops, those primarily grown for the seed yield such as the legumes, corn and grasses, as well as a great variety of woody, herbaceous and ornamental plant species.

It has long been considered desirable to provide a class of agents capable of preventing the flowering of buds on growing or cut plants. In handling ornamental flowers great losses are incurred by the premature opening of the blossoms and subsequent withering of the plants before the blossoms can be disposed of. The ability to control the opening of the flower bud to produce a blossom is likewise important among commercial agricultural crops. Heretofore, the materials proposed for this application, while successful to a limited degree in preventing the formation of the flower, have caused more or less deep seated alterations in the color, form or scent of the flower, or have interfered with ability of the flower to produce viable seed. Furthermore, such treatments frequently cause mutations to occur in the seed. We have discovered that when applied to the buds of a great variety of plants, the compounds of our invention are capable of retarding the blossoming period for important lengths of time. Upon eventual opening of a flower bud we have found that the blossom produced is in every way the equivalent of the blossom produced upon the untreated plant. The only apparent change in the growth habit of the plant is in the delayed opening of the blossom and no apparent change or damage to the blossom can be seen.

Another important effect exhibited by the growth regulant compositions of our invention is in the ability to prevent the sprouting of a great variety of tuberous materials. This ability is particularly important in the commercial culture of plants which are tuberous propagated, such as for example, the potato and the turnip. Our materials possess the ability to prevent sprouting under conditions when such would occur to a disastrous extent.

Our growth regulants are also effective in preventing the sprouting of leaves and buds of woody plants. Retardation of growth of woody plants, shrubs or trees is an effect which has important implications in many fields of agriculture. For example, by delaying the budding or blossoming of citrus trees during a period when frost conditions threaten or, in northern climates, to retard the spring budding of fruit trees such as the apple, cherry, pear, peach and the like would in many instances determine the difference between a crop of fruit and a complete loss. Similarly in the treatment of ornamental shrubs and trees, the ability to delay spring blossoming has great utility.

The surprising effectiveness of the α-cyano-β-(m- and p-chlorophenyl) acrylic growth regulants is evidenced in a variety of formulations and in a great variety of concentrations. For example, growth response is achieved by employing our materials in aqueous solution or in aqueous suspension. In the latter instance it is frequently desirable to employ along with the aqueous suspension a dispersing agent. Examples of such surface-active agents which can be employed in forming dispersions include salts of the alkyl and alkylaryl sulfonates, such as du Pont MP-189 and Nacconol-NR, alkyl sulfates, such as Dreft, alkylamide sulfonates, such as Igepon-T, the alkylaryl polyether alcohols, such as Triton X-100, the fatty acid esters of polyhydric alcohols, such as Span, the ethylene oxide addition products of such esters, as for example Tween, and the addition products of long-chain mercaptans and ethylene oxide, such as Sharples Non-Ionic-218. Still other surface-active agents can be employed, the above merely showing a representative list of the more common materials.

Likewise, it is possible to achieve the growth regulation characteristic of the α-cyano-β-(m- and p-chlorophenyl) acrylic structure in dry formulations. In such formulations the active ingredient is extended in a solid inert carrier. Typical of such carriers are talc, clay, cellulosic powders or other solid diluents. Such formulations have particular utility in the treatment of seeds, wherein an aqueous application may promote premature germination, or where a solvent application may damage the seed. For certain field crop applications we also prefer a dust formulation wherein a wet application might introduce a certain secondary effect which is undesirable. Further specific examples of such typical inert solid carriers which can be employed as diluents in our dust formulations include fuller's earth, pyrophillite, bentonite, montmorillonite, attaclay, the Filtrols, celite and the like.

The α-cyano-β-(m- and p-chlorophenyl) acrylic growth regulants of our invention are in many instances soluble in a great variety of solvents. Among the organic solvents which can be employed as the carrier for our active agents we use hydrocarbons, such as benzene, xylene or toluene; ketones, such as acetone, methylethyl ketone and cyclohexanone; chlorinated solvents, such as carbon tetrachloride, trichloro- and perchloroethylene; esters, such as ethyl, butyl, and amyl acetates; and alcohols, such as ethanol, isopropanol, and amyl alcohols. Other solvents which we employ are the Carbitols and Cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

Furthermore a combination of such methods of application can be employed in order to achieve desirable spreading or wetting characteristics. Typical of such formulations include wettable powders wherein the active ingredient is first admixed with a solid carrier as described above in combination with a small amount of dispersing or surface-active agent. The resultant dry formulation can then be added to water for further dilution prior to application and provide a dispersion of the active ingredient and the solid carrier in water. Likewise oil-in-water emulsions can be employed and are sometimes preferred. Typical of such formulations are compositions wherein the active ingredient is first dissolved in an organic solvent either soluble or insoluble in water and this concentrated solution is then added to water with or without a surface active agent to form emulsions suitable for application.

In addition we have found that we can incorporate an adherent or sticking agent such as vegetable oils, naturally occurring gums and other adhesives in our α-cyano-β-chlorophenyl acrylic growth regulants. Furthermore we can employ humectants in our formulations. In addition such formulations can be employed in admixture with fungicidal materials, other biocides such as insecticides, larvicides, bacetricides, herbicides, growth suppressants, vermicides, miticides or with other materials which are desired to apply along with our growth regulants including such diverse materials as fertilizers.

Having thus described typical α-cyano-β-(m- and p-chlorophenyl) acrylic growth regulants, methods for their preparation, formulation and application, and having described typical results obtained on living plants by so applying, we do not intend that our invention be limited except by the appended claims.

We claim:

1. A method for regulating the growth processes of plants which comprises applying thereto a plant response composition containing as active ingredient in amount sufficient to provide a positive plant response a material selected from the group consisting of monomeric α-cyano-β-(m-chlorophenyl)acrylic acid, monomeric α-cyano-β-(p-chlorophenyl)acrylic acid, and carboxylic derivatives thereof, and a substantially inert carrier as a dispersant therefor.

2. A plant response composition containing as a principal active ingredient in amount sufficient to provide a positive plant response a material selected from the group consisting of monomeric α-cyano-β-(m-chlorophenyl)-acrylic acid, monomeric α-cyano-β-(p-chlorophenyl)-acrylic acid, and carboxylic derivatives thereof, an inert carrier and a surface-active agent.

3. The composition of claim 2 wherein the carrier is further defined as consisting of a solid dust.

4. The composition of claim 2 wherein the principal active ingredient is α-cyano-β-(p-chlorophenyl) acrylic acid.

5. The composition of claim 2 wherein the principal active ingredient is sodium α-cyano-β-(p-chlorophenyl) acrylate.

6. The composition of claim 2 wherein the principal active ingredient is α-cyano-β-(m-chlorophenyl) acrylic acid.

7. An aqueous plant response composition containing as a principal active ingredient in amount sufficient to provide a positive plant response a material selected from the group consisting of monomeric α-cyano-β-(m-chlorophenyl)acrylic acid, monomeric α-cyano-β-(p-chlorophenyl)acrylic acid, and carboxylic derivatives thereof, a substantially inert carrier as a dispersant therefor and a surface-active agent.

8. An oil-in-water plant response emulsion containing as a principal active ingredient in amount sufficient to provide a positive plant response a material selected from the group consisting of monomeric α-cyano-β-(m-chlorophenyl)acrylic acid, monomeric α-cyano-β-(p-chlorophenyl)acrylic acid, and carboxylic derivatives thereof, and a substantially inert carrier as an adjuvant therefor.

References Cited in the file of this patent

UNITED STATES PATENTS

| | | |
|---|---|---|
| 2,326,471 | Lontz | Aug. 10, 1943 |
| 2,394,916 | Jones | Feb. 12, 1946 |
| 2,446,836 | King | Aug. 10, 1948 |
| 2,667,411 | Mowry et al. | Jan. 26, 1954 |

OTHER REFERENCES

Walther et al. in "Beilstein's Handbuch der Organischen Chemie," 4th edition (1926), vol. 9, p. 895.